INVENTORS.
Darwin G. Smith and
BY Stanley J. Ketterer

Marshall J. Breen
ATTORNEY

June 9, 1959 D. G. SMITH ET AL 2,889,790
APPARATUS FOR PRODUCING PIPED GARMENT OPENINGS
Original Filed Dec. 3, 1953 10 Sheets-Sheet 2

INVENTORS.
Darwin G. Smith and
BY Stanley J. Ketterer

Marshall J. Breen
ATTORNEY

INVENTORS.
Darwin G. Smith and
Stanley J. Ketterer
BY
Marshall J. Breen
ATTORNEY June 9, 1959  D. G. SMITH ET AL  2,889,790
APPARATUS FOR PRODUCING PIPED GARMENT OPENINGS
Original Filed Dec. 3, 1953  10 Sheets-Sheet 4

INVENTORS.
Darwin G. Smith
and Stanley J. Ketterer
BY Marshall J. Breen
ATTORNEY

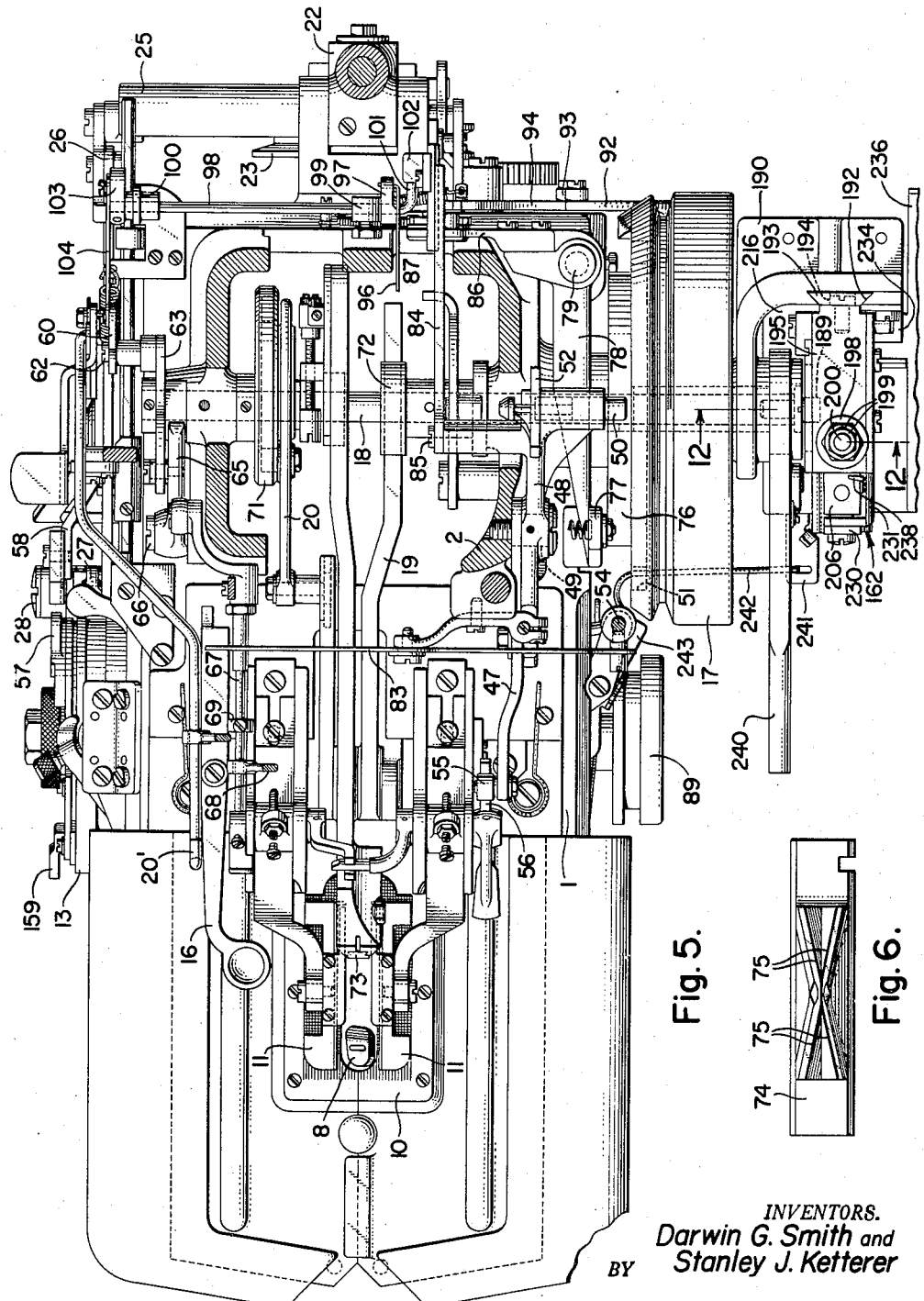

June 9, 1959 D. G. SMITH ET AL 2,889,790
APPARATUS FOR PRODUCING PIPED GARMENT OPENINGS
Original Filed Dec. 3, 1953 10 Sheets-Sheet 6
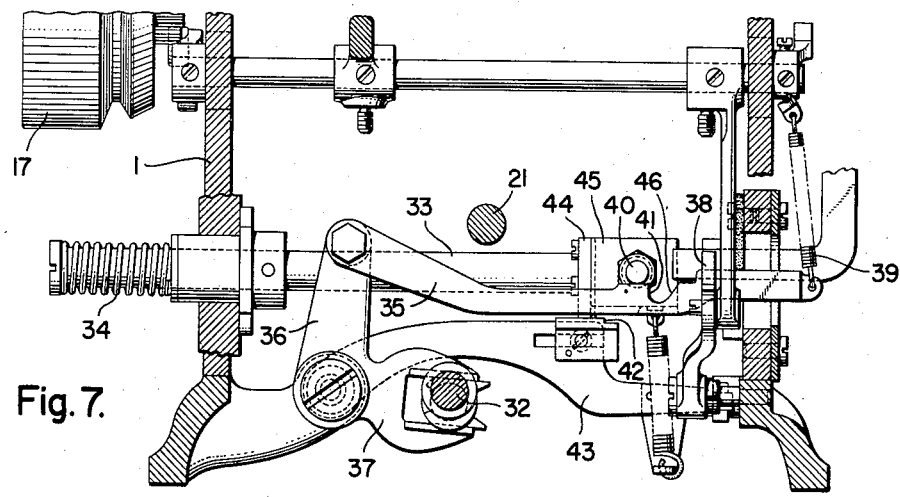
Fig. 7.
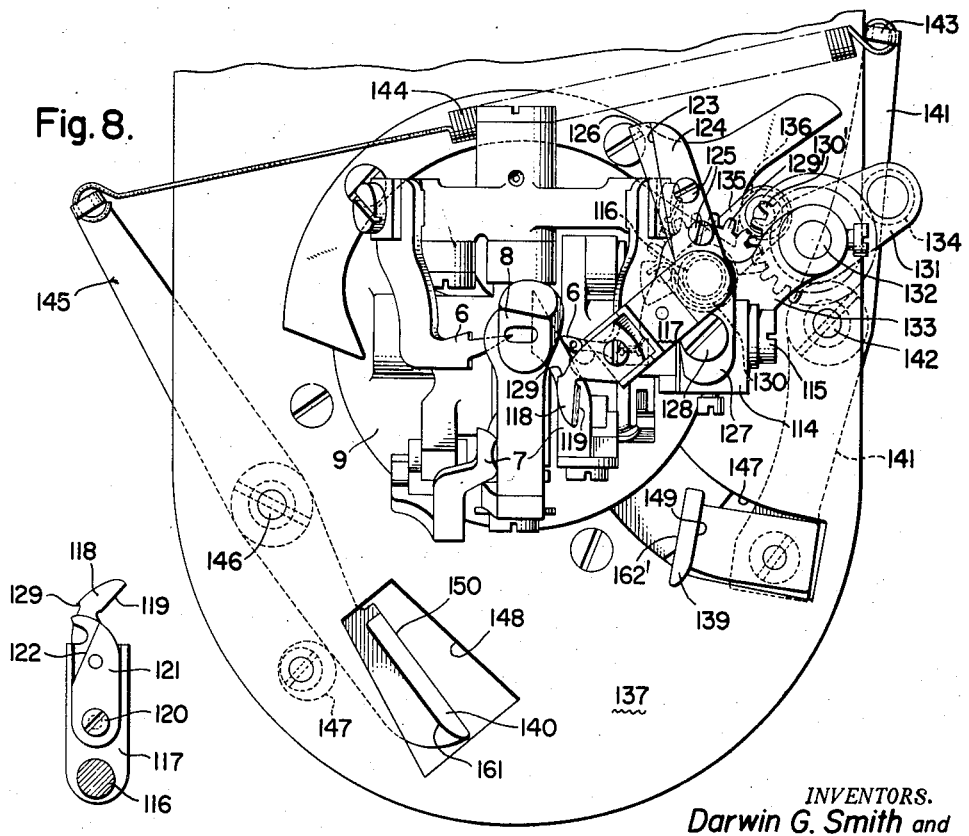
Fig. 8.
Fig. 9.
INVENTORS.
Darwin G. Smith and
BY Stanley J. Ketterer
Marshall J. Breen
ATTORNEY

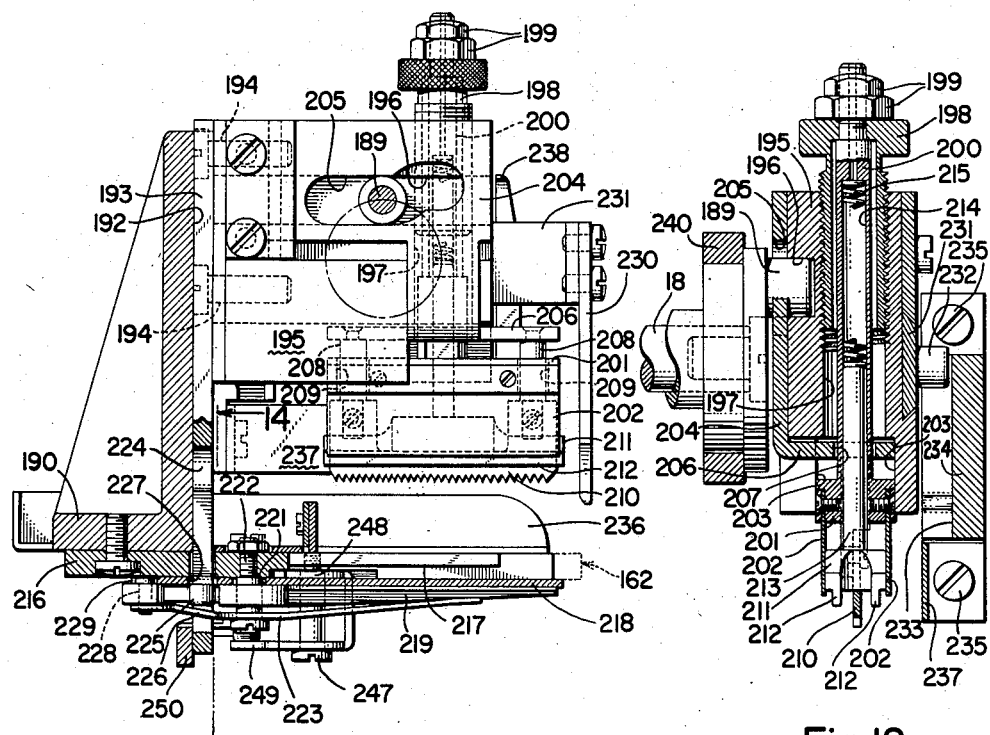

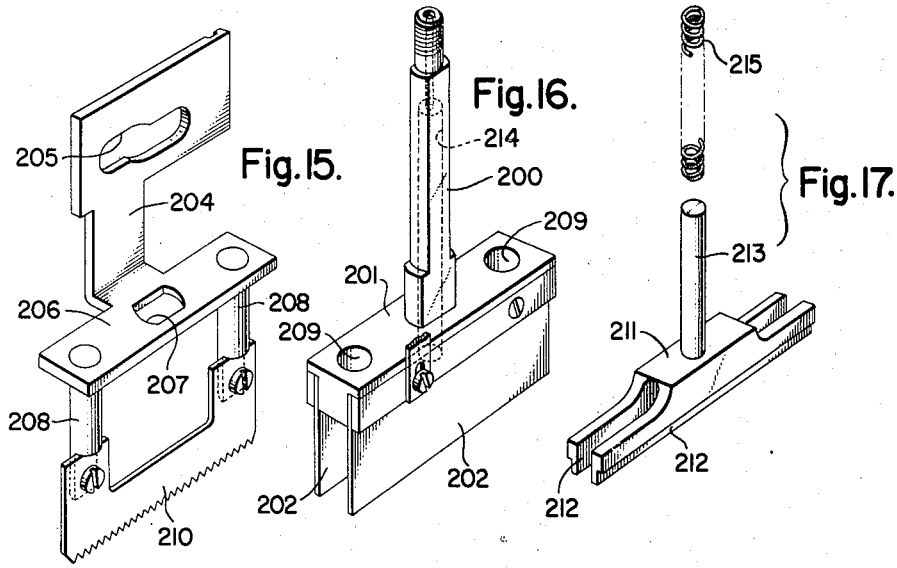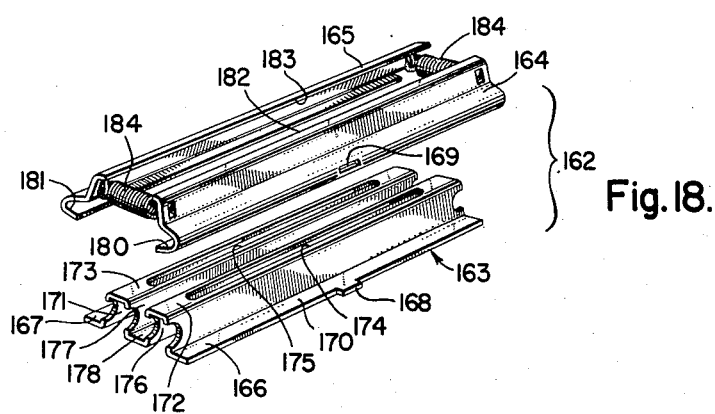

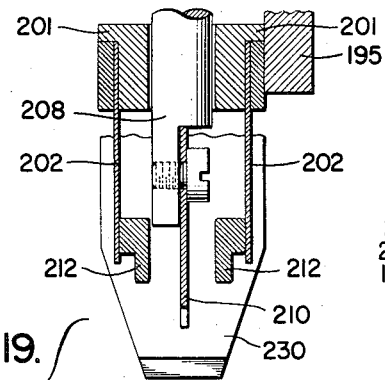
Fig.19.
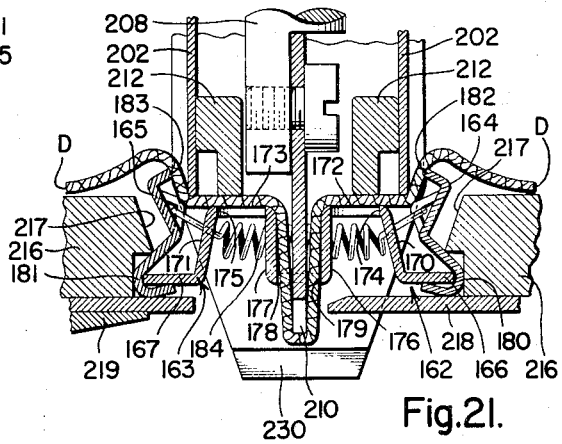
Fig.21.
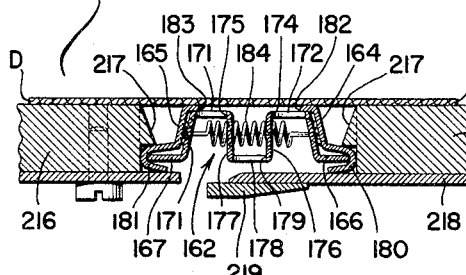
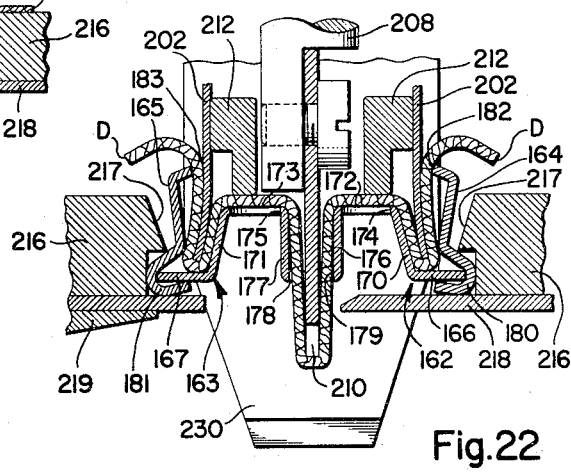
Fig.22
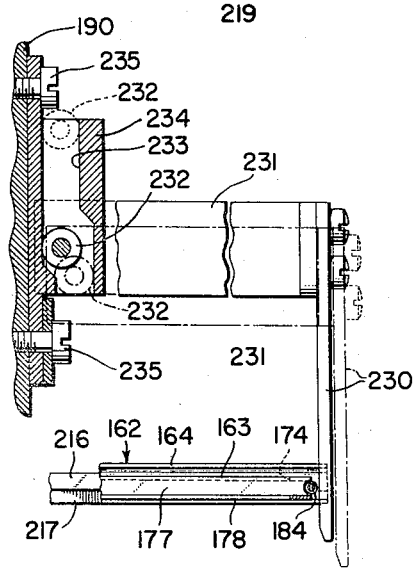
Fig.20.
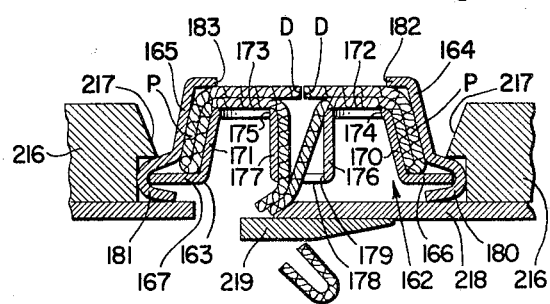
Fig.23.
INVENTORS.
Darwin G. Smith and
BY Stanley J. Ketterer
Marshall J. Breen
ATTORNEY

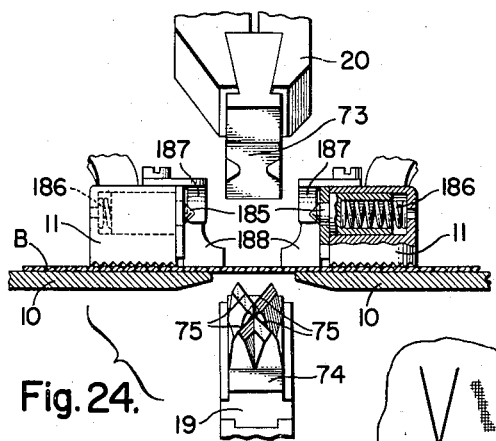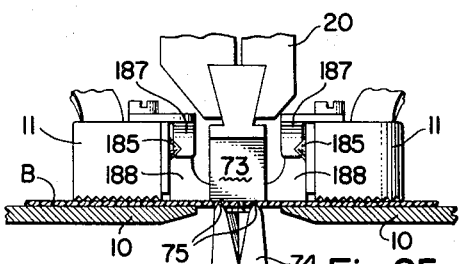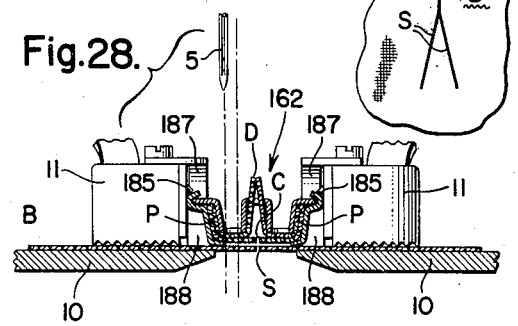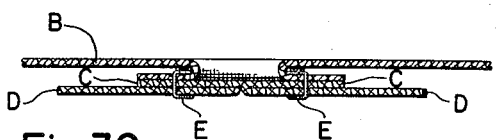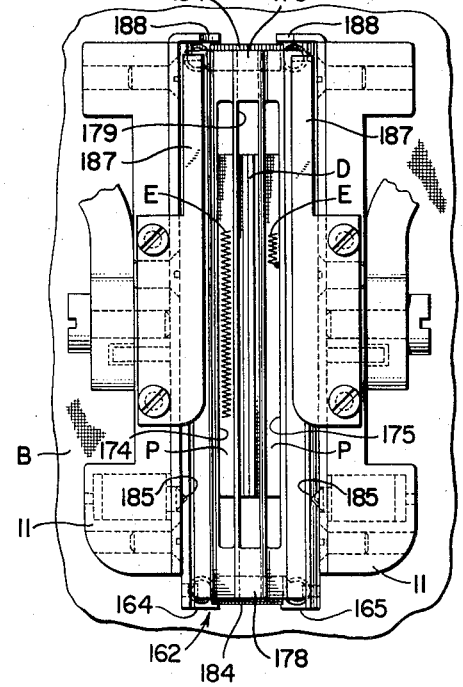
INVENTORS.
Darwin G. Smith and
Stanley J. Ketterer

United States Patent Office 2,889,790
Patented June 9, 1959

2,889,790

APPARATUS FOR PRODUCING PIPED GARMENT OPENINGS

Darwin G. Smith, Bridgeport, and Stanley J. Ketterer, Stratford, Conn., assignors to The Singer Manufacturing Company, Elizabeth, N.J., a corporation of New Jersey Original application December 3, 1953, Serial No. 395,966, now Patent No. 2,780,193, dated February 5, 1957. Divided and this application March 7, 1956, Serial No. 570,172

14 Claims. (Cl. 112—65)

The present invention relates to an apparatus for finishing piped or bound garment openings, such as buttonholes, pockets, belt slits or the like. This application constitutes a division of our co-pending application Serial No. 395,966, filed December 3, 1953, now Patent No. 2,780,193, February 5, 1957.

A piped opening is one in which the body material is finished around the opening or slit by a piece or pieces of fabric secured to the body material by concealed stitches. Such piped openings and methods of making them are shown in the patents of Zilinsky, No. 1,945,104, Jan. 30, 1934, and Altobelli, No. 2,388,516, Nov. 6, 1945, and are referred to therein as piped buttonholes. Generally speaking, in making such buttonholes, folded piping strips are placed upon that face of the body material which is to be exposed in the completed garment. Stitching passing through the folded piping strips and the body material secure the piping strips with their respective fold-edges in abutting relation, the line of abutment being in register with a slit in the body material extending substantially the full length of the piping strips. After the stitching is completed, the piping strips are pushed through the slit in the body material to the opposite face thereof, the body material adjacent the stitching being folded to conceal the stitching and at the same time form a substantially rectangular opening upon the normally exposed face of the body material which is closed by the piping strips, the fold-edges of which abut along the longitudinal centerline of the opening. The piped opening is then ready for the final finishing operations which are fully explained in a pending application of S. J. Ketterer, Serial No. 397,536, filed Dec. 11, 1953, now Patent No. 2,761,403, dated September 4, 1956, and which form no part of the present invention. Piped openings such as hereinbefore described have an attractive appearance but, because of the quality hand work needed in their manufacture, have been confined usually to expensive high-grade clothing.

It is an object of the present invention to provide an improved apparatus whereby the bound buttonholes can be produced mechanically with a degree of uniformity not heretofore obtainable following known hand methods.

This and other objects and advantages of the invention will best be understood from the following description of a method and machine for producing piped buttonholes, as illustrated in the accompanying drawings.

In the drawings:

Fig. 5 is a horizontal section through the bracket-arm standard of the machine, showing the machine bed in plan.

Fig. 6 is an enlarged bottom plan view of the slit cutting element which is carried in the lower jaw of the work-cutting mechanism.

Fig. 7 is an enlarged fragmentary transverse section through the machine bed showing details of the rapid-feed control mechanism.

Fig. 8 is an enlarged fragmentary top plan view of the lower stitch-forming mechanism and the thread-cutting device.

Fig. 9 is a bottom plan view of one of the members of the thread-cutting device.

Fig. 11 represents an enlarged vertical sectional view taken substantially along the line 11—11, Fig. 4, showing details of the piping strip loading device.

Fig. 12 represents an enlarged vertical sectional view taken substantially along the line 12—12, Fig. 5.

Fig. 13 is an enlarged bottom plan view of the piping strip loading device, showing the automatically actuated scissors for cutting the single piping blank into separate strips after the piping blank has been pushed into the opened piping strip holding frame by the loading device.

Fig. 14 is an enlarged fragmentary vertical sectional view taken substantially along the line 14—14, Fig. 11, illustrating the cam-slot for actuating the movable blade of the scissors during the downstroke of the plunger of the loading device.

Figs. 15, 16 and 17 are perspective views of the elements which, when assembled, constitute the plunger of the loading device.

Fig. 18 is a disassembled perspective view of the two sheet-metal parts of the piping strip holding frame.

Fig. 19 represents an enlarged fragmentary vertical sectional view of the piping strip loading device taken substantially along the line 19—19, Fig. 1, showing the relative position of the parts and the piping strip blank just before the loading device is actuated.

Figures 1, 10:
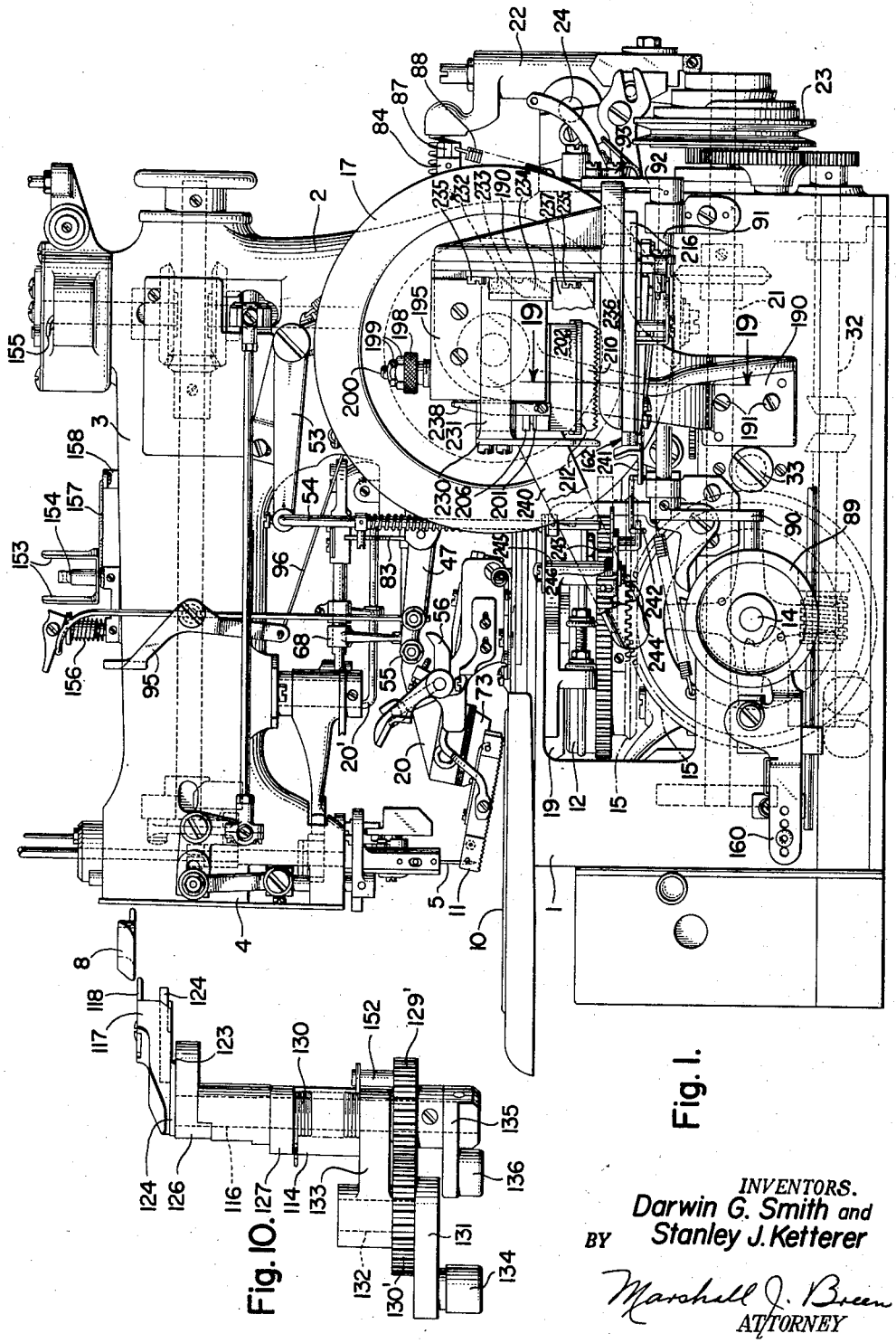
Fig. 1 is a right side elevational view of a conventional eyelet end buttonhole sewing machine which has been equipped with a preferred embodiment of the present invention.
Fig. 10 is an elevational view of a portion of the thread-cutting device, showing its pair of actuating levers which are so disposed as to actuate the thread-cutter properly during the stitch-forming cycle.

Fig. 20 is a left side elevational view, partly in section, of the holding frame jaw spreader on the loading device, showing in full lines the spreader located between the jaws of the holding frame to maintain them separated for easy introduction of the piping strip into the holding frame, and in dot-dash lines the spreader moved laterally from between the jaws to permit them to spring shut on the folded piping strips.

Fig. 21 is a view similar to Fig. 19, but with the loading device plunger lowered to the point where the spreader has separated the two movable jaws of the holding frame and the central blade of the plunger has engaged and folded the center of the piping strip blank.

Fig. 22 is a view similar to Fig. 21, but with the plunger of the loading device advanced to its lowest position in which the holding frame has been completely loaded, the spreader device laterally shifted from between the two movable jaws of the holding frame, and the scissors opened wide in preparation for their blank cutting action.

Fig. 23 is a view like Fig. 22, but showing only the holding frame after it is completely loaded and the scissors has closed to cut the piping patch into two separate piping strips each firmly clamped in the holding frame.

Fig. 24 is a view, partly in section, showing the work-clamp of the sewing machine closed upon the body material and the two elements of the slit cutting mechanism in position to close and cut the body material.

Fig. 25 is a view similar to Fig. 24, but with the two elements of the slit cutting mechanism closed upon the work.

Fig. 26 is a view of the body material after the same has been cut.

Fig. 27 is an enlarged top plan view of the work-clamp closed upon the body material and fitted with the loaded holding frame, the zigzag lines illustrating stitching securing the piping strips to the previously cut body material.

Fig. 28 represents a vertical sectional view taken transversely of the holding frame, with the work-clamp in elevation, showing the manner in which the needle passes through the needle-slots in the holding frame and secures the folded piping strips to the body material in proper register with the slit in the body material.

Fig. 29 is a view representing the completed seam as produced by a machine equipped in accordance with the present invention.

Fig. 30 illustrates the seam produced after the piping strips, secured as in Fig. 29, are pushed through the slit in the body material to the opposite face thereof.

The operation of the machine will be more easily understood considering first the steps of the novel method of forming piped openings performed by the machine, these steps being different than those heretofore customary in the manufacture of piped openings by hand or machine.

Figs. 24 through 30 illustrate a piped opening, in this case a buttonhole, in its progressive stages of formation. A body material B in which the buttonhole is to be formed is positioned and clamped in the work-clamp of the machine and when so clamped the body material is miter slit, as at S, Fig. 26. After the slitting operation is completed, the properly folded pair of piping strips P are placed upon the body material B in a manner such that the raw edges C and D are disposed adjacent each other and in register with the slit S in the body material. The folded piping strips are then stitched to the body material along each side of the slit by parallel rows of stitching E extending substantially the length of the slits S in the body material. The seam produced thereby is disclosed in Fig. 29 and represents the completed buttonhole as far as the present invention is concerned. After the stitching is completed the body material with the attached piping strips is removed from the sewing machine, following the piping strips P are pushed down through the slits in the body material B and folded back flat against the under side of the body material (Fig. 30) so that the stitches E are now entirely concealed from the top or exposed surface of the body material.

The essential difference between the present method of producing piping openings over those methods previously known is that in the present case the piping strips are placed upon the body material after the said body material is slit. In previously known methods, it has been common practice not to slit the body material until after the piping strips have been placed upon and completely stitched or partially attached to the body material. An important advantage gained from using the present method is that it is much simpler to cut the necessary miter-slit in the body material when the piping strips are not yet applied, by virtue of the fact that the absence of the piping strips exposes the body material in the vicinity of the portion thereof to be slit. Obviously, with the body material unobstructed by the piping strips a very simple type of slit cutter can be used. A type of work-cutting device which has been used with considerable success in the practice of the present method has been one of the die and solid anvil type which produces a very uniform miter slit in all kinds of materials. In this type of cutting device a die of selected size, such as shown in Fig. 6, is forced into contact with and thereby severs a body material which lays upon a solid anvil usually made of a material softer than the die. It will be appreciated that a single die having a cutting edge shaped exactly in accordance with the required miter slit can be readily used since no piping strips are disposed on the body material which, if they were, would interfere with the closing of the die against the anvil. Also, since the miter slitting is accomplished before the piping strips are stitched to the body material, there is no possibility of the stitches which secure the piping strips to the body material being severed by the miter slitting device, which may occur when the slitting is done after the stitching has been completed. It is a fact that the improved method lends itself to the use of an existing sewing machine, such for example as a slightly modified conventional cut-first buttonhole machine, which can be utilized first to cut the body material and then to sew the piping strips to the body material in proper register with the slit.

In the drawings, Figs. 1 to 23 illustrate a piped buttonhole machine embodying the invention and capable of performing the novel method above described. The machine has, in general, constructive features which are substantially in accordance with the disclosure in the U.S. reissue patent of E. B. Allen, No. 15,324, reissued April 4, 1922. The machine is constructed with a frame having a bed 1 from which rises a hollow standard 2 formed with an overhanging tubular bracket-arm 3 terminating in a head 4.

The stitch-forming mechanism has a fixed operative position in the frame of the machine and is constructed substantially in accordance with the disclosure of U.S. Patent No. 1,372,473 of Mar. 22, 1921, and comprises an upper endwise reciprocatory and laterally vibratory needle 5 and the under thread-looping devices including the loopers 6 and the loop-retainers 7; the usual needle-throat member or button through which the upper needle 5 works being indicated at 8. The under thread-looping devices and needle-throat member are carried on a turret 9 which turns about a vertical axis together with the upper needle mechanism at the ends of the buttonhole to place the stitches on opposite sides of the buttonhole.

The work is held in a work-clamp which partakes of traveling movements longitudinally of the bed 1 and side-shift movements laterally of the bed 1, to distribute the stitches about a buttonhole. The work-clamp includes right and left clamp sections each comprising a lower clamp-plate 10 and an upper clamp-foot 11 carried thereby and movable toward and away from the lower clamp-plate to grip and release the work. As the present work-clamp and the means for moving it are constructed substantially in accordance with the disclosure of the above mentioned Reissue Patent No. 15,324, suffice it to say that longitudinal movements are imparted to the work-clamp through suitable connections with a feed-cam groove formed in the top surface of the main feed-wheel 12, and transverse or side-shift lateral movements are imparted to the work-clamp by a pattern cam 13 which is mounted externally of and at one side of the machine-bed 1 on a cross rotary shaft 14 connected by one-to-one bevel gears 15 to the main feed-wheel 12. The feed-cam groove is designed to impart to the work-clamp a certain fixed overall longitudinal motion including the motion required to shift the work-clamp from sewing position to buttonhole slit cutting position to give room for the cutter to act without clashing with the stitch-forming mechanism. At the start of a cycle the work-clamp occupies a position adjacent one end of its range of longitudinal traveling movement, known as buttonhole slit cutting position.

To start the machine, a first starting lever 16 is depressed and this connects a cutting wheel 17 in the usual manner to close the work-clamp, and following this a cutting shaft 18 is caused to turn first to bring the cutting levers 19 and 20 forward into proper position, then to close the cutting levers to miter-cut the body material, and then the connected feed- and pattern-wheels 12 and 13 are driven by a rapid-feed driving mechanism to carry the work-clamp quickly from starting or slit-cutting position to an extreme forward position to facilitate the introducing of the loaded workholder or clip into the upper clamp feet 11 of the work-clamp. A suitable trip on the pattern wheel 13 trips the rapid feed to bring the machine to rest with the work-clamp in its extreme forward clip-loading position. After the work-clamp is loaded, the machine is again manually started by pulling a second starting lever 20' and the rapid feed driving mechanism quickly moves the work-clamp to the point of its longitudinal motion where the stitching is to begin. At this point, automatically the stitch-forming mechanism is started and the rapid feed drive is thrown out. The stitching then progresses down the first side of the buttonhole until the first line of stitching (see Fig. 27) is completed, following which the stitching mechanism is automatically stopped and the rapid feed is thrown in to turn the stitching mechanism quickly about a vertical axis properly to position the stitching mechanism to begin the return line of stitching. When the turning of the stitching mechanism is completed, the rapid feed drive is thrown out and the stitching mechanism is started to complete the buttonhole. At the completion of the second line of stitching, the pattern cam trips the stop motion to stop the stitching shaft, and the rapid feed drive is again rendered effective to feed the work-clamp back to its starting or slit-cutting position. When the work-clamp is returned to its slit-cutting position the work-clamp is opened to release the work.

From the foregoing, it will be understood that the length of a buttonhole made by the machine depends upon the position in the total longitudinal travel of the work-clamp at which the sewing is started and stopped. By arranging to start the sewing later and stop it correspondingly earlier in a complete cycle of motion or revolution of the connected feed- and pattern-wheels 12 and 13, a shorter buttonhole may be made or vice versa. Of course, the rapid-feed drive controls must be correspondingly adjusted to take care of the changed positions at which the first rapid feed motion is started.

The stitch-forming mechanism is driven by a main sewing shaft 21, the operation of which is controlled by a stop-motion device including a stop-motion lever 22 which is tilted from its stop-position to a running position to connect the sewing shaft 21 to the source of power represented by a grooved belt-pulley 23. The stop-motion lever 22 is fixed to the pivot-shaft 24 carrying the crank-arm 25 which is connected by a link 26 to a lever 27 fulcrumed at 28 on the machine-bed and carrying a cam-follower nose 29 in position to be engaged by the "start-sewing" cam-rise 30 and released by the "stop-sewing" drop-off shoulder 31 on the pattern-wheel 13. When the stitch-forming mechanism is operating, the main feed-wheel 15 and with it the pattern wheel 13 are driven in step-by-step fashion to place the stitches about the buttonhole, through the well known pin-and-star-wheel drive not shown in the drawings, but fully illustrated and described in the U.S. reissued Patent No. 15,324, April 4, 1922.

The rapid feed of the work-clamp from starting position to the extreme forward or loading position and return is effected by the usual constantly running rapid feed drive-shaft 32 which, through a worm-and-gear reduction (not shown), drives a live element of a clutch, the driven element of which is fast on the cross-shaft 14.

The construction and operation of the clutch is fully disclosed in the above mentioned reissued Patent No. 15,324. The clutch is engaged and disengaged by mechanism including a cross-slide rod 33 (Fig. 7) biased in one direction by a coil-spring 34 and forcibly shifted in opposition to the coil-spring by a push-rod 35 connected to the upstanding arm 36 of a bell-crank lever having its horizontal arm 37 forked to straddle a crank on the rapid feed drive-shaft 32. The push-rod 35 is continuously reciprocated and is held in a lowered or ineffective position by a latch 38 and biased upwardly by a spring 39 into cooperation with a stud-pin 40 carried on a clutch shifting member (not shown) secured to the cross-slide rod 33. When the latch 38 is automatically released the push-rod 35 is drawn upwardly by its spring 39, effecting engagement of the stud-pin 40 on the cross-slide rod 33 by a shoulder 41 on the push-rod 35 which thereupon shoves the cross-slide rod 33 to its extreme rapid-feed throw-in position in which it is retained by engagement of a shoulder 42 on a latch-lever 43 by the lower edge of a plate 44 secured on the hub of an arm 45. On the return endwise impulse of the constantly reciprocating push-bar 35 to the left, Fig. 7, the inclined shoulder 46 engages the stud-pin 40 and depresses the push-bar 35 sufficiently to be re-engaged by the latch 38 and again held in idle position. From the above, it will be understood that the tripping of the latch 38 will throw into action the mechanism for rapidly driving the feed-cam 15 and pattern wheel 13 and the actuation of the latch-lever 43 will effect a throwing out of action of the mechanism for rapidly driving these elements. The connections employed for tripping the latch 38 and operating the latch-lever 43 are well known and are fully disclosed for instance in the U.S. patent of E. B. Allen, No. 1,548,815, August 11, 1925.

The work-clamp, which includes the lower clamp-plate 10 and the upper clamp-foot 11, is adapted to be closed on the work by a clamp-closing arm 47 (Figs. 3 and 5) connected to the horizontal arm of a bell-crank 48 pivoted at 49 on the machine-standard 2 and carrying at the upper end of its vertical arm a plunger 50 spring-biased outwardly to enter a clamp-closing groove 51 provided in the inner face of the continuously running cutting wheel 17; the plunger 50 being normally held in its retracted position by a latch 52 connected to one arm of a bell-crank lever 53 operated by a manually actuated starting rod 54. At the beginning of a machine cycle, the starting rod 54 is pulled downwardly and the latch 52 releases the plunger 50 which then enters the cam-groove 51 and in the continued rotation of the cutting wheel 17 the bell-crank 48 receives a single complete rocking movement after which the plunger 50 is ejected and again latched in retracted position. The clamp-closing arm 47 carries at its forward end a roller 55 which on its downward movement is adapted to depress an arm 56 to close the work-clamp.

Figure 2:
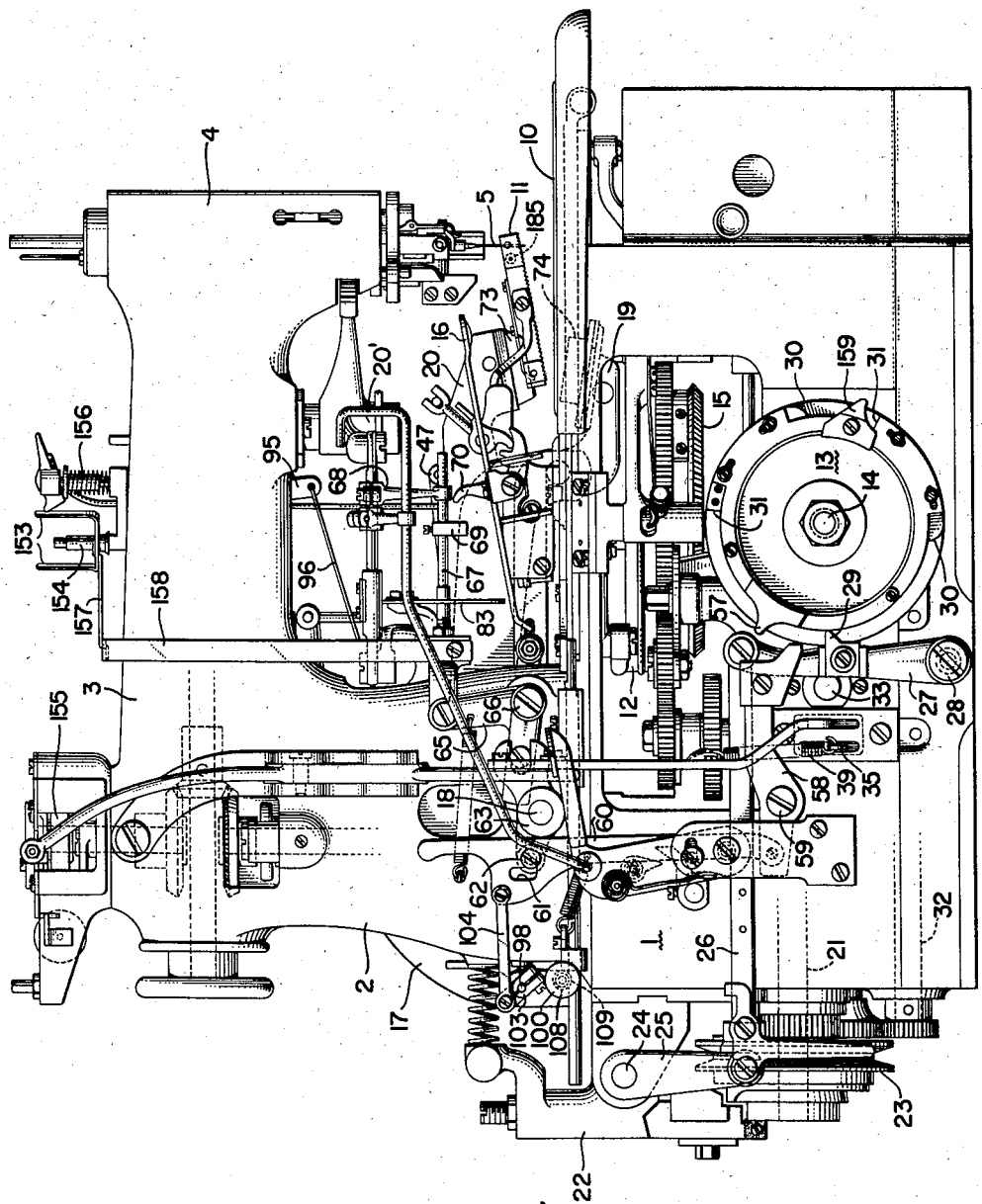
Fig. 2 is a left side elevational view of the machine shown in Fig. 1, illustrating the usual clamp-closing lever, the actuation of which also throws into action the slit-cutting mechanism and the piping strip loading device, and the manually actuated starting lever for initiating the stitching mechanism following the return of the slit-cutting mechanism to its retracted position.

In order automatically to open the work-clamp at the completion of the machine cycle, there is provided a mechanism operated by the pattern wheel 13. Referring to Fig. 2, the pattern wheel 13 is shown as provided with a work-clamp opening cam trip 57 which is disposed to engage the nose-piece of a lever 58 which is pivoted at 59 to the machine bed 1. Connected to the other end of the lever 58 is a link 60 formed with an L-shaped slot 61 entered by a stud 62 carried on one end of a lever 63 pivoted on shaft 18 and operatively connected at its other end to a bell-crank 65 fulcrumed at 66. To one of the arms of the bell-crank 65 there is connected one end of a push-rod 67 slidable in a depending support 68 and carrying an abutment-block 69 in position to engage a lever 70 which actuates the usual clamp-opening and -closing rock-shaft. From the foregoing, it will be understood that when the cam-trip 57 engages the lever 58 the push-rod 67 is endwise moved to the right in Fig. 2 and the abutment-block 69 engages and actuates the lever 70 to open the work-clamp.

The work-cutting mechanism of the present machine is constructed substantially in accordance with the disclosure of the U.S. Patent No. 1,548,815, Aug. 11, 1925, and embodies the traveling cutter levers 19 and 20 (Fig. 5) which are given their customary traveling and closing-and-opening movements by suitable cams 71 and 72 on the cutter-shaft 18 to which a single rotation is imparted prior to sewing by the continuously rotating pulley 17 acting through the usual one-revolution clutch. At their free ends the cutter levers 19 and 20 carry a solid anvil 73 (Fig. 2) and a cutter block 74, the latter of which, as shown in Fig. 6, is formed with appropriately shaped cutting edges 75 which cooperate with the solid anvil as shown in Fig. 25 to miter cut the body material B.

Figure 3:
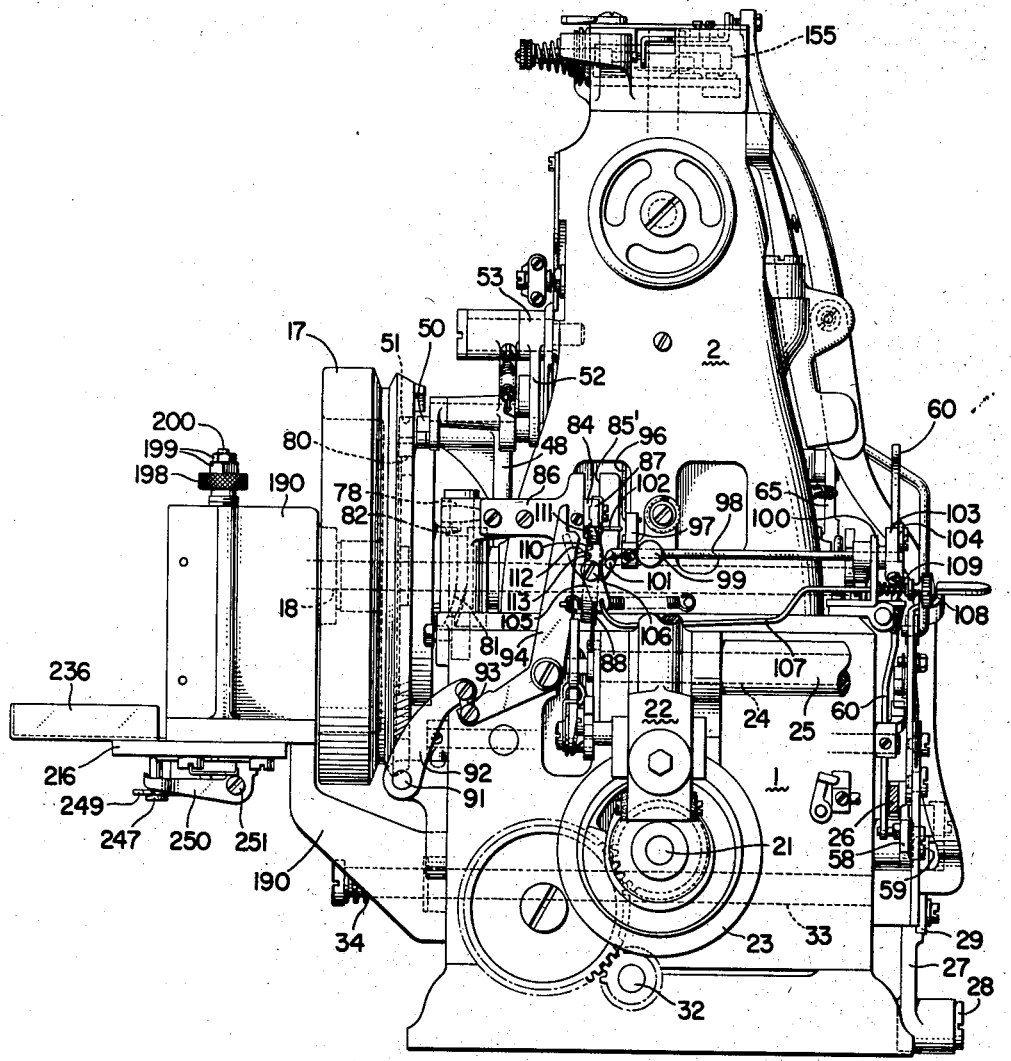
Fig. 3 is a rear elevational view of the sewing machine, showing some of the details of a manually actuated safety device which operates to preclude the opening of the work-clamps and the operation of the slit-cutting mechanism in the event of sewing thread breakage while stitching the piping strips to the body-material.

The one-revolution clutch is well known and includes a spring-pressed clutch-tooth (not shown) which slides radially of a disk 76 (Fig. 5) fast on the cutter-shaft 18. The clutch-tooth is held in retracted position by the head 77 of a cutter-clutch control or cutter-starter lever 78 fulcrumed at its rear end on the vertical stud-pin 79 (Figs. 3 and 5). When the cutter-starter lever 78 is shifted clockwise about the stud-pin as viewed in Fig. 5, the head 77 of the cutter-starter lever releases the clutch-tooth which is projected outwardly radially of the disk 76 into the path of movement of the internal teeth 80 on the pulley 17. The construction and mode of operation of the cutter-starter lever and cutter-clutch are more fully disclosed in the above mentioned Patent No. 1,548,815. It will be understood that when the cutter-starter is shifted to running position the cutter-shaft 18 is coupled to the power pulley 17 for one revolution only and is thereupon disconnected from the pulley 17 and brought to rest by the automatic return of the cutter-starter 78 to stopping position; this return being effected by a cam-groove 81 (Fig. 3) in the hub of the disk 76 on the cutter-shaft acting upon a follower-pin 82 which is carried by the cutter-starter 78 and enters the cam-groove 81.

As previously mentioned, the machine in which the invention is presently embodied is adapted to miter-cut the body-material before the stitching is started. When the operator presses down upon the first starting lever 16, the vertical starting rod 54 is, through the lever 83, pulled downwardly to initiate the action of the clamp-closing mechanism. Referring to Fig. 5, it will be seen that when the starting rod 54 is pulled downwardly, the latch 52 releases the plunger 50 which then enters the cam-groove 51 and in the continued rotation of the cutting wheel 17 the bell-crank 48 receives a single complete rocking movement after which the plunger 50 is ejected and again latched in retracted position. During the last half of the rocking movement of the bell-crank 48, the cutter-starter 78 is shifted to running position by means of a cutter-starter shifter 84 (Figs. 3 and 5) which is in the form of a push-rod pivoted at 85 on the clamp-closing bell-crank 48 and, at its other end, projecting through a slot 85' in a lever-arm extension 86 of the cutter-starter 78. The portion of the push-rod 84 which projects through the slot 85' in the cutter-starter lever-arm 86 has longitudinally adjustably mounted upon it a slide-plate 87 formed with a depending tooth which, when the push-rod 84 rides upon the lower edge of the slot 85' in the cutter-starter lever-arm 86 under the influence of a spring 88, engages the lever-arm 86 and shifts the latter to running position in the return impulse of the clamp-closing lever 47.

The machine is provided with mechanism such as disclosed in U.S. Patent No. 1,504,306, of Aug. 12, 1924, for locking the clutch-device for the buttonhole cutting mechanism against accidental operation during a predetermined period of the operation of the machine. This mechanism comprises a cam 89 (Figs. 1 and 3) which actuates a follower-arm 90 fast on a rock-shaft 91 to which is fixed an arm 92 connected by a link 93 to a bell-crank lever 94. The lever 94 at its upper end cooperates with the push-bar 84 and the clutch-starter-lever 86 in the same manner disclosed in the above mentioned U.S. Patent No. 1,504,306.

In the present machine it is essential that when the machine is started, the stitching operation be completed before the work-clamp is opened to release the piping strips and the body material. Also, it is important that if the thread breaks during the stitching operation, the work-clamp remains closed and the operation of the miter cutting mechanism be interrupted so that the machine can be rethreaded and the machine recycled to the point where the stitching can be again started to complete the previously interrupted stitching operation. To that end, the machine is equipped with a work-clamp opening and miter cutting throw-out mechanism which is manually actuated by a hand-lever 95 (Figs. 1, 2, 3 and 5) pivoted on the bracket-arm of the machine. The hand-lever 95 is connected by a wire-link 96 running through the machine-standard 2 to a rock-lever 97 (Fig. 3) which is fast upon a rock-shaft 98 extending across the back of the machine and journaled adjacent one end in a beaming stud 99 and adjacent its other end in an angle bracket 100. One end of the rock-shaft 98 is bent at a right angle to provide a trip-finger 101 which underlies a horizontal extension or lift-plate 102 attached to the push-bar 84. At its other end, the rock-shaft 98 has clamped upon it a rock-arm 103 connected by a link 104 to the link 60 of the clamp-closing and -opening mechanism hereinbefore described. From the foregoing, it will be understood that if the thread breaks after the machine cycle has progressed to the point where the work-clamp is closed, the miter cut in the body material is completed and the stitching of the piping strips is in progress, then the operator merely presses upon the upper end of the hand-lever 95. Actuation of the hand-lever, through the wire-link 96 and rock-arm 97, turns the rock-shaft 98 causing the trip-finger 101 to engage the lift-plate 102 on the push-bar 84 and thereby elevate it to a safe position where the push-bar-tooth is well above the bottom edge of the slot 85 in the cutter-starter lever-arm 86, in which position the push-bar 84 may reciprocate idly without clutching the pulley 17 to the cutter-shaft 18. To maintain the push-bar 84 in a safely elevated position, there is provided a push-bar blocking latch 105 (Fig. 3) pivoted at 106 on the lever 86 and having connected to it a push-rod 107 journaled for endwise movement in the bracket 100, the push-rod having on its exposed end a thumb-button 108 and a coil-spring 109 acting between the thumb-button 108 and the bracket 100. The spring 109 normally biases the blocking latch 105 in a counterclockwise direction, as viewed in Fig. 3, against a stop-pin 110 on the lever 86 so that its nose 111 lies directly beneath the push-bar 84 to hold it in elevated position. Pressure on the thumb-button 108 will turn the blocking latch 105 in a clockwise direction, thereby allowing the push-bar 84, under the influence of the spring 88, to drop into the slot 112 provided in the blocking latch 105. Automatic means are provided for shifting the blocking latch 105 from beneath the push-bar 84 so that, after the defect which required the operation of the hand-lever 95 has been corrected, the blocking latch 105 will be moved to ineffective position should the operator fail to press the thumb-button 108 at the proper time. This means comprises a pin 113 carried by the blocking latch 105 and extending from the latch sufficiently far to lie in the path of swing of the bell-crank lever 94. Thus, it will be understood that if the parts are in the position as shown in Fig. 3, swinging movement of the bell-crank lever 94 occasioned by the turning of the cam 89 will cause the lever 94 to strike the pin 113 and force the blocking latch 105 from beneath the push-bar 84. Referring now to Fig. 2, it will be seen that turning of the rock-shaft 98, resulting from the manual actuation of the hand-lever 95, will shift the lever 60 of the work-clamp-opening and-closing mechanism in a clockwise direction, when viewed in Fig. 2. This movement of the lever 60 locates the stud 62 on the lever 63 in the vertical limb of the L-shaped slot 61 in the lever 60, providing in effect a lost motion connection between levers 60 and 63. When the stud 62 is located in the vertical limb of the L-shaped slot 61, actuation of lever 58 by the work-clamp opening cam trip 57 will merely result in an idle vertical stroke of the lever 60. Thus the work-clamp will not be opened.

To provide for cutting the sewing threads at the end of each line of stitching, the machine is fitted with a thread pull-off and severing device which is automatically operated by the rotation of the turret. The device is best illustrated in Figs. 4, 8, 9 and 10 and is constructed substantially in accordance with the device forming the subject of the U.S. patent of E. P. Spaine, No. 2,499,335, Feb. 28, 1950. The device comprises a supporting body or frame 114 secured by a screw 115 to the turret 9. Journaled vertically in the frame 114 is an oscillatory knife-carrying shaft 116 having preferably formed integral therewith a horizontal arm 117 to the upper surface of which is secured a hardened knife-blade 118. The knife-blade 118 is formed with a sharpened needle-thread-cutting edge 119 disposed so that during the return swing of the knife-blade the edge 119 contacts and severs the tensioned work-limb of a needle-thread-loop which is retained on one of the loop-retainers 7. To the under side of the horizontal arm 117 there is secured by a screw 120 (Fig. 9) a second hardened knife-blade 121 provided in its under face with a knife-edge 122 adapted to swing into shearing relation with a sharpened edge 123 formed on a stationary ledger blade 124 secured by screws 125 on a supporting member 126. The supporting member 126 is bored longitudinally to provide an extension of the bearing for the oscillatory knife-carrying shaft 116 and, at its lower end, the member 126 is formed with an extension 127 clamped upon the top of the frame 114 by a clamp-screw 128 extending through a slot in the extension 127. Through the medium of the slot and the clamp-screw 128 the ledger-blade supporting member 126 can be adjusted circularly for a limited extent about the axis of the knife-carrying shaft 116. As will be seen in Fig. 8, the knife-blade 118 is formed with a relatively shallow notch providing a thread-engaging hook 129 which is disposed so as to pick up the limb of the looper thread as the knife-carrying arm 117 is swung in a clockwise direction (Fig. 8) toward the ledger-blade 124. The knife-blade 118, upon seizing the limb of the looper thread and moving toward the ledger-blade 124, pulls off a length of looper thread from the supply so that the beginning end of the thread is long enough to start the next stitching operation and the piping strip holding frame or clip, later to be described, is not stitched to the body material. The pull-off action on the looper thread is terminated by the severing of the looper thread as the knife-edge 122 moves across the ledger-blade 123. On the return swing of the knife-carrying arm 117 under the action of a spring 130 the knife-edge 119 of the blade 118 contacts and severs the needle-thread.

Figure 4:
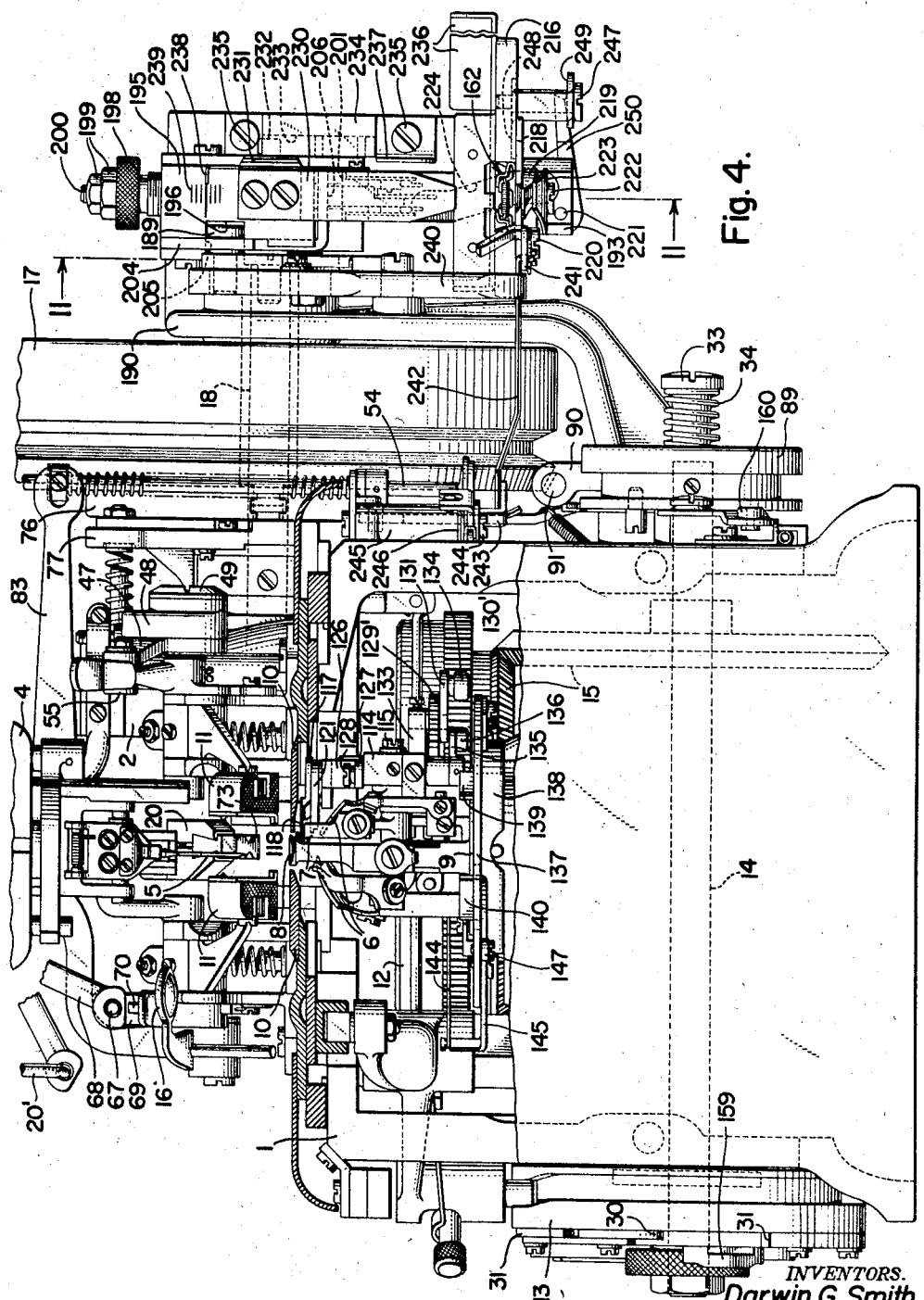
Fig. 4 is an enlarged front end view, partly in section, of the bed-portion of the sewing machine, showing the piping strip holding frame in the loading device in preparation for loading thereby.

Oscillation of the knife-carrying shaft 116 is effected by the turning of the turret 9 which occurs at the completion of the stitching of the first piping strip and again at the completion of the stitching of the second piping strip. In Figs. 4 and 8, it will be seen that the knife-carrying shaft 116 has a sector-gear 129' secured on its lower end. This sector-gear meshes with a full gear 130' preferably secured on the hub of a crank 131 journaled on a pivot-stud 132 depending from the extended lower limb 133 of the supporting frame 114. Carried by the free end of the crank 131 is a roller 134. Secured to the lower end of the knife-carrying shaft 114 is a second crank 135 (Fig. 10) carrying at its free end a roller 136. The cranks 131 and 135 are employed to oscillate the knife-carrying shaft 116, the crank 135 providing for actuating the thread-cutter during the first rotation of the turret, which takes place at the completion of the stitching of the first piping strip, and the crank 131 providing for actuating the thread-cutter during the second or return rotation of the turret, which occurs at the completion of the stitching of the second piping strip.

To actuate the cranks 131 and 135, there is pivoted to a stationary plate 137 fixed on the turret-supporting-bracket 138 (Fig. 4) a pair of abutment members 139 and 140. Abutment member 139 is mounted on the free end of a carrier-arm 141 pivoted on the stud 142 and upturned at its other end, as at 143, to receive one end of a coil-spring 144. The other end of the coil-spring is connected to the upturned end of a second carrier-arm 145 pivoted on the stud 146 and at its other end having integrally formed therewith the abutment member 140. The abutment members 139 and 140 project upwardly through clearance openings 147 and 148 in the stationary plate 137, the coil-spring 144 acting between the two carrier-arms 141 and 145 to bias the upturned end 143 of the carrier-arm 141 against the edge of the plate 137 and the carrier-arm 145 against an adjustable stop 147 secured to the under side of the plate 137.

Referring to Fig. 8, it will be understood that the abutment members 139 and 140 are spaced a different distance outwardly from the vertical axis about which the turret 9 rotates, the member 139 being closer to the vertical axis than the member 140. In operation during the first partial rotation of the turret, which takes place at the end of the stitching of the first piping strip, the entire thread-cutting device including the rollers 134 and 136 turns with the turret, and during this turning movement the roller 136 contacts the back face 149 of the abutment member 139, causing the abutment member and its carrier-arm 141 to pivot about the pivot-stud 142 without actuating the knife-carrying shaft 116. In other words, the abutment-member 139 is by-passed during the initial portion of the turning of the turret. As the turret continues to turn the roller 134, which has also by-passed the abutment member 139, moves into contact with the front face 150 of the abutment member 140 and this abutment member, being held stationary by the stop 147, causes the crank 131 to turn in a counter-clockwise direction (Fig. 8) which, through the meshing gears 129' and 130, effects a turning of the knife-carrying shaft 116 in a clockwise direction. As previously described, clockwise movement of the knife-carrying shaft 116 effects a pull-off of the looper thread, a subsequent severing of the looper thread and a cutting of the needle thread, the latter action occurring during the return swing of the knife-carrying horizontal arm 117 responsive to the action of the coil-spring 130 (Fig. 10) which acts between a pin 152 projecting upwardly from the gear 129' and the frame 114. The return swing of the arm 117 does not take place until the turret 9 has rotated to the point where the roller 134 has moved beyond the abutment member 140. The roller 136 is not affected by the abutment member 140 because the roller 136 is located sufficiently close to the center of the turret as to miss the abutment member 140 completely. At the appropriate time, a length of needle-thread is pulled from the supply by the usual needle-thread pull-off 153 (Fig. 2) which comprises a U-shaped element pivoted on a stud 154 located at the top of the bracket-arm 3, the vertical arms of the U-shaped element engaging the needle-thread as it passes from the regular take-up 155 to the thread-nipper 156. The U-shaped element is turned on the pivot-stud 154 by a link 157 which is connected to the upper end of an arm 158 rigidly connected to the usual work-clamp opening push-rod 67. As previously described, the work-clamp opening push-rod 67 is actuated by the work-clamp opening cam trip 57. Also, there is a needle-thread pull-off trip 159 which, like the trip 57, is secured on the pattern wheel 13. During the first rotation of the turret 9, the needle-thread pull-off trip 159 actuates the push-rod 67 to operate the needle-thread pull-off device, the usual work-clamp opening lever 70 at this time being located out of range of movement of the push-rod 67 so that the work-clamp is not opened.

To facilitate in pulling off a length of looper thread, the machine is preferably equipped with a common form of looper thread pull-off 160 (Fig. 1) which is timed to pull the looper thread from the supply at each turn of the turret and just before the looper-thread trimmer cuts the thread. From the above it will be understood that when the turret turns through 180 degrees at the end of the stitching of the first piping strip, both the needle thread and the looper thread are cut with the cut ends of the two threads sufficiently long so that the next line of stitching can be correctly started and the piping strip clip is not stitched to the work.

After the second piping strip is stitched to the body material, the turret is rotated in a reverse direction to position the turret properly to start the next buttonhole. During the reverse turning of the turret the roller 134 strikes the back face 161 of the abutment member 140, which member yields about its pivot 146 so as not to interfere with the rotation of the turret. During the continued movement of the turret, the roller 134 moves beyond the abutment member 140, allowing the abutment member 140 to swing back into engagement with its stop 147, the roller 136 then moving into engagement with the front face 162' of the abutment member 139 which is prevented from yielding about its pivot 142 by virtue of the fact that the upstanding end 143 of the carrier-arm 141 is in contact with the side edge of the plate 137. Contact of the roller 136 with the abutment member 139 actuates the thread pull-off and trimmer to pull-off the looper-thread, sever the looper-thread and upon the return swing of the knife-carrying arm 117 cut the needle-thread. After the final operation of the combination thread pull-off and severing device the rapid feed drive feeds the work-clamp back to its starting or slit-cutting position where the work-clamp is opened to release the work.

As hereinbefore mentioned, the folded piping strips are adapted to be held in proper register with the miter slit in the body material by the work-clamp preparatory to the stitching of the strips to the body material. To facilitate the holding of the piping strips in their proper folded condition upon the body material there is provided a piping strip holding frame 162 which is adapted to be held in the work-clamp during the stitching operation. The piping strip holding frame is best shown in Figs. 18, 19, 20, 21, 22, 23, 27 and 28, and comprises a body member indicated generally as 163, Fig. 18, and a pair of movable jaw members 164 and 165 pivotally supported on the body member. The body member 163 is preferably formed of sheet metal and comprises a pair of horizontal side flanges 166 and 167, each of which is formed with an ear 168 disposed to enter a notch 169 provided in the jaw members 164 and 165 which are pivotally mounted on the flanges. Intermediate the flanges 166 and 167 the body member is formed with two raised fixed jaw members 170 and 171 which are disposed in piping strip clamping relation with the pivotally mounted jaw members 164 and 165. Each of the fixed jaw members 170 and 171 is formed with a flat piping strip supporting surface 172, 173 and each of these flat surfaces is provided with a needle clearance slot 174, 175 through which the needle passes during the sewing of the piping strips to the body material. Between the two fixed jaw members 170 and 171 the body member is formed with vertical parallel walls 176 and 177 connected at their opposite ends by bridge pieces 178 which together with the walls 176 and 177 define a fabric clearance opening 179 (Fig. 27).

The movable jaw members 164 and 165 are best shown in Fig. 18. These movable jaw members are reversely bent along their lower edge portions, as at 180 and 181, to embrace and thereby pivot on the outer longitudinal edges of the flanges 166 and 167 of the body members 163. The upper longitudinal edges of the jaw members 164 and 165 are bent inwardly to provide work-engaging edges 182 and 183 which are spring pulled into piping strip clamping relation with the fixed jaw members 170 and 171 by coil-springs 184 suitably attached between the two movable jaw members. It will be understood that the two movable jaw members 164 and 165 can be moved away from their respective fixed jaw members 170 and 171 to permit the introduction of the piping strips into the holding frame and, in so moving, the movable jaws pivot about the longitudinal edges of the flanges 166 and 167 of the body member 163 against the action of the coil-springs 184. As will be seen in Fig. 23, when the movable jaw members 164 and 165 are released to return to work-clamping relation, the piping strips P are clamped in folded condition and when the holding frame is placed in the work-clamp of the machine (Fig. 28) the piping strips are held in proper register with the slit S in the body material. As will be seen in Figs. 24 and 28, the upper clamp feet 11 of the work-clamp are fitted with plungers 185 biased by the springs 186 in a direction to engage the piping strip holding frame and thereby maintain the front end of it in contact with the body material B. The rear end of the piping strip holding frame is yieldingly depressed by leaf-spring members 187 which are secured to the upper clamp feet 11. Stops 188 (Fig. 27) are employed to locate correctly the holding frame lengthwise of the work-clamp.

To facilitate the loading of the piping strip holding frame there is provided a loading device which may be manually or power driven independently of the sewing machine but, in its preferred form, is shown mounted to be actuated by an extension or crank 189 provided on the one-revolution cutter shaft 18 of the sewing machine. The loading device is adapted to handle a single piping strip patch of predetermined rectangular size, which patch is folded along its medial line and then automatically cut into two sections, each of which is folded into U-shape during its insertion between the work-clamping jaws of the piping strip holding frame. While it is possible that the present loading device can readily handle two piping strips which are half the width of a single patch, the single patch is preferable for the reason that the design in the material forming the piping strip is better matched as is also the color of the resulting two piping strips. Referring particularly to Figs. 4, 5, 11, 12, 13 and 14, the loading device, in its preferred form, comprises a supporting bracket 190 attached by screws 191 (Fig. 1) to the bed 1 of the sewing machine. The bracket 190 is formed with a vertically disposed undercut guideway 192 (Fig. 5) in which is endwise slidably mounted a slide 193. As shown in Fig. 11, the slide 193 has attached to it by screws 194 adjacent its upper end a plunger block 195 formed in one of its side faces with a horizontal groove 196 disposed to receive the crank pin 189. The plunger block 195 is vertically bored, as at 197 (Fig. 12), and threaded to receive a sleeve-like thumb-nut 198. Disposed in the bore 197 of the plunger block 195 and fastened to the thumb-nut 198 by the two nuts 199 is a rod 200 (Figs. 12 and 16) formed at its lower end with a transverse head 201. Fixed to the transverse head 201 are two depending relatively thin piping strip loading blades 202 which function in a manner later to be described. As will be seen in Fig. 12 the transverse head 201 is widthwise sized to engage and thereby be guided by the sides 203 of a channel formed in the bottom of the plunger block 195.

Disposed in sliding contact with the left hand side of the plunger block 195 is a plate-like patch-dividing plunger 204 (Figs. 11, 12 and 15) having adjacent its upper end an actuating slot 205 positioned to receive the crank-pin 189. At its lower end the patch-dividing plunger 204 is bent to provide a horizontal offset 206 which is apertured, as at 207, to receive the rod 200 so that it may overlie the transverse head 201 of the plunger 200. Riveted or otherwise secured to the offset 206 are two depending guide-rods 208 which are endwise slidable in two holes 209 formed in the transverse head 201 of the rod 200. Attached to and bridging the lower ends of the guide-rods 208 is a patch-dividing element or tongue 210 which is located between the two piping strip loading blades 202 with its lower edge located below the level of the bottom edges of the loading blades 202. Yieldingly resting on the patch-dividing element 210 is a piping strip stripper member 211 having spaced elongated piping strip engaging sections 212 disposed to straddle the patch-dividing tongue 210 (Fig. 12), the stripper member 211 having a cylindrical shank 213 endwise slidable in a bore 214 formed in the rod 200. A spring 215 bearing at its upper end against the rod 200 and at its lower end against the end of the shank 213 yieldingly biases the stripper member 211 in a downward direction.

Attached to the supporting bracket 190 of the loading device is a base plate 216 slotted vertically beneath the patch-dividing tongue 210 to provide opposed piping strip holding frame locating jaws 217 between which the piping strip holding frame 162 is inserted. Located beneath the base plate in close proximity thereto is a scissors device which is automatically actuated to sever the piping strip patch into two symmetrical halves, each half serving as a piping strip for the bound buttonhole. As will best be seen in Figs. 11 and 13, the scissors device preferably comprises two movable blades 218 and 219. The blade 218 is pivoted for limited swinging movement about a fulcrum-screw 220 which is threaded into the base-plate 216. Extending through a slot 221 (Fig. 13) formed in the blade 218 is a second fulcrum-stud 222 on which is pivoted the blade 219. Also mounted on the fulcrum-stud 222 is a leaf spring 223 which normally biases the two blades 218 and 219 into shearing relation. The two blades are actuated by the endwise reciprocation of the slide 193. To that end, the slide 193 (Fig. 14) is formed with an inclined scissors actuating cam slot 224 through which projects the reduced shank 225 of the blade 219 and the reduced shank 226 of the leaf-spring 223, the slide 193 extending downwardly through an elongated clearance aperture 227 provided in the blade 218. The free end of the shank 225 of the blade 219 is provided with a pin 228 which is embraced beneath the blade 219 by the bifurcated end of the shank 226 of the spring 223 and above the blade 219 the pin 228 enters a notch 229 (Fig. 11) in one end of the blade 218. It will be understood that as the slide 193 is endwise reciprocated the inclined cam slot 224 imparts to the blade 219 pivotal movement about its fulcrum-stud 222 and movement of the blade 219 through the pin 228 causes simultaneous pivotal movement of the blade 218 about its fulcrum-screw 220, the respective movements of the two blades being such as to effect a scissors action between the two blades.

To facilitate the inserting of the piping strip patch into the holding frame 162, the loading device is fitted with a holding frame opening device which functions on the downstroke of the loading device to open the jaw-members 164 and 165 of the holding frame. The opening device is designed to permit the jaw-members to close immediately, the holding frame is loaded so that the folded piping strips will be retained properly in the holding frame. This holding frame opening device is best shown in Figs. 1, 19, 20, 21, and 22, and comprises a wedge-shaped jaw-opening member 230 attached at its upper end to the outer end of a slide 231 movable in a horizontal guideway formed in the right hand side wall of the plunger block 195. At its inner end, the slide 231 carries a roller 232 which enters a cam-track 233 formed in a stationary block 234 attached by screws 235 (Fig. 20) to the supporting bracket 190. It will be understood that when the plunger block 195 has imparted to it its downward or loading stroke the jaw-opening member is carried downwardly with it so that the wedge-shaped lower end of the jaw-opening member enters between the two jaw members 164 and 165, as shown in Fig. 21, and opens the jaw-members in such a way as to permit the loading blades 202 to fold and insert the piping strips between the fixed and movable jaws of the piping strip holding frame without any resistance from the spring 184. During the major portion of the downward stroke of the jaw-opening member 230, the roller 232 is traveling in the straight portion of the cam-track 233. After the loading blades 202 have completed their function of inserting the piping strip into the holding frame, the roller 232 strikes the cam-rise in the cam-track 233 and shifts the slide 231 and the jaw-opening member 230 from jaw-separating position (full lines in Fig. 20) to an ineffective position (dot-and-dash lines in Fig. 20) in which the jaw-opening member 230 is moved endwise of the holding frame and no longer engages the movable jaw-members 164 and 165 thereof. On the upstroke of the plunger block 195 the jaw-opening member remains in its ineffective position until it rises above the level of the holding frame when the roller 232 operating in the cam-track 233 again shifts the jaw-opening member back into a position and that it will enter between the movable jaw-members of the holding frame on the succeeding down-stroke of the plunger block 195.

Mounted on the base plate 216 is a patch-receiving tray 236 disposed at an elevation such that a single fabric patch placed on said tray can be manually slid sidewise over the piping strip holding frame 162 in the manner shown in Fig. 19. To guard the operator's fingers against injury, there is provided a finger guard 237 which is spaced slightly above the tray 236 and extends to a point forwardly of the piping strip loading blades 202. It will be appreciated that the depth of penetration of the piping strip loading blades 202 is controlled by the selected position of adjustment of the thumb-nut 198 (Fig. 12) in the plunger block 195 and, to assist in making the proper adjustment, the transverse head 201 to which the loading blades 202 are attached has secured to it a pointer 238 whose upper end cooperates with indicia 239 scribed on the front face of the plunger block 195. In buttonhole sewing machines of the type to which the present improvement is applied, it is customary to employ a hand lever on the cutter shaft 18 to facilitate the hand operation of the sewing machine through that portion of the cycle in which the buttonhole is cut. In the present machine a hand lever 240 is provided by which the cutter shaft 18 can be turned during that portion of its single revolution that the cutter levers 19 and 20 move to actually cut the buttonhole slit in the body material.

Since the loading device is mounted on the sewing machine to be actuated by the cutter shaft, it is necessary to provide a safety device which will operate to prevent the starting of the machine if the piping strip holding frame 162 is not properly located in the loading device. The preferred form of safety device is best shown in Figs. 1, 4 and 5, and comprises a lever 241 pivoted to the base plate 216 of the loading device. This lever 241 is connected by a wire link 242 to an abutment piece 243 pivoted on the screw 244 threaded into a lug 245 on the machine bed 1. A spring 246 normally biases the abutment piece 243 in a direction such that it underlies and blocks the lower end of the manually actuated starting rod 54 when there is no piping strip holding frame 162 (Fig. 5) in the loading device or when the piping strip holding frame is not properly located in the loading device. As will be seen in Fig. 5, when the piping strip holding frame is positioned properly in the loading device, the holding frame maintains the lever 241 in such a position that a starting rod hole in the abutment piece 243 registers exactly with the starting rod 54, permitting the first starting lever 16 to be pressed downwardly to start the machine.

There is provided a piping strip holding frame ejector which operates to displace the holding frame partially out of the loading device at the completion of the loading of the piping strip holding frame. This ejector is best illustrated in Figs. 11, 13 and 14, and comprises a simple bell crank lever pivoted on the stud 247 and having an upper holding frame contacting arm 248 and a lower actuating arm 249. Disposed to cooperate with the lower actuating arm 249 is a trip-lever 250 pivoted, as at 251, to the lower end of the slide 193. One end of the trip lever is formed with an angularly disposed offset 252 (Fig. 14) and the other end is formed with an ear 253 which is bent to engage the edge of the slide 193. It will be seen in Fig. 14 that during the downstroke of the slide 193 the trip lever 250 upon contacting the arm 249 swings upwardly about its pivot 251 and thereby by-passes the arm 249. The trip lever then swings back under gravity to a position such that on the upstroke of the slide 193 the angularly disposed offset 252 engages the arm 249 and swings the bell crank lever in a direction such that the holding frame contacting arm 248 is actuated to eject the holding frame outwardly of the loading device.

Operation

Assume that the work-clamp of the sewing machine is open with a body material B placed in the clamp and the piping strip holding frame 162 is properly located in the loading device with a single patch D placed on the base plate 216 over the holding frame in the loading device as illustrated in Fig. 19.

To start the machine, the first starting lever 16 is depressed and this action releases the clamp-closing plunger 50 which is spring-biased outwardly to enter the clamp-closing groove 51 provided in the inner face of the continuously running cutting wheel 17. The plunger 50 tracking the clamp-closing groove 51 effects a single complete rocking movement of the clamp-closing arm 47 which carries at its forward end a roller 55 which on its downward movement is adapted to depress the work-clamp arm 56 and close the work-clamp on the body-material B (Fig. 24). During the upward movement of the clamp-closing arm the cutting shaft 18 is caused to turn to first bring the cutters levers 19 and 20 forward to cut the miter slit in the body material (Fig. 25). During the above action the loading device driven by the cutting shaft has traveled through its cycle and the piping strip holding frame 162 is completely loaded (Figs. 19 through 23). The functioning of the loading device will be described in detail later in the specification.

Immediately before the cutting shaft 18 completes its single revolution the rapid feed is rendered effective to advance the work-clamp to an extreme forward position (i.e. in a direction toward the operator) to facilitate introducing the loaded piping strip holding frame into the work-clamp, following which the rapid feed is tripped off by the latch 38 controlled in the well known manner by the pattern wheel 13.

The loaded piping strip holding frame 162 which has been withdrawn from the loading device is now inverted and inserted in the upper clamp-foot 11 of the work-clamp (Fig. 28) which work-clamp remains tightly closed on the body material B so that the miter slit previously cut in the body material is firmly held in proper position. After the piping strip holding frame 162 is properly inserted in the work-clamp, the machine is again manually started by pulling a second starting lever 20' which renders the rapid feed effective quickly to move the work-clamp to the point of its longitudinal motion where the stitching is to begin. At this point, automatically the rapid feed is thrown out of action and the pattern wheel trips out the stop motion on the sewing shaft in order to start the stitching mechanism. The stitching then progresses down the first side of the buttonhole until the first line of stitching is completed. This first line of stitching, which is shown as composed of zigzag stitches although it is obvious that it may be a line of straight-away stitches secures the left-hand folded piping strip P as viewed in Fig. 29 to the body material B by stitches E with the folded piping strip being accurately positioned with respect to the miter slit S. At the end of the first line of stitching, the pattern wheel effects a stopping of the stitching mechanism and a throwing in of the rapid feed to turn the stitching mechanism quickly about a vertical axis properly to position the stitching mechanism to begin the return line of stitching. During this rapid feed the needle thread and the looper thread are pulled off so that the beginning ends are long enough and the two threads are also cut so that the piping strip holding frame is not stitched to the body material. When the turning of the stitching mechanism is completed, the rapid feed drive is thrown out and the stitching mechanism is started to complete the buttonhole. At the completion of the second line of stitching, the pattern cam trips the stop motion to stop the stitching shaft, and the rapid feed drive is again rendered effective to feed the work-clamp to its starting or slit-cutting position. When the work-clamp is returned to its slit-cutting position the turret is reversely turned properly to position the stitching instrumentalities for the next buttonholing operation, the pattern cam trips the work-clamp opening lever and during the turning of the turret and the opening of the work-clamp thread is drawn from the supply and the two threads are cut.

The two piping strips are now stitched to the body material and the piping strip holding frame 162 can be removed from the work-clamp and pulled loose of the stitching piping strips. The machine has now completed its operation.

The operation of the loading device is as follows: A single patch P, from which the two piping strips are to be formed, is placed upon the tray 236 and slid laterally onto the base plate 216 (Fig. 19) directly over the holding frame 162. When the cutting shaft 18 of the sewing machine undergoes its single revolution the crank pin 189 attached thereto also makes a single revolution. As will be seen in Fig. 11 the plunger block 195 is secured to the slide 193, and the slide 193, the plunger block 195 and all the elements, such as the loading blades 202, the patch-dividing tongue 210 and the stripper members 212, carried by the plunger block reciprocate therewith in response to the rotation of the crank-pin 189. As the crank-pin 189 begins its rotation from the position illustrated in Fig. 11, the plunger block 195 begins its descent carrying with it all the elements supported thereby. Owing to the particular shape of the actuating slot 205 in the patch-dividing plunger 204, the patch-dividing tongue 210 is moved downwardly relatively to the two piping strip loading blades 202 a small amount during the initial descent of the plunger block 195 after which it moves with the plunger block during substantially the rest of its downward movement.

As the plunger block 195 moves downwardly toward the base plate 216, the wedge-shaped jaw-opening member 230 engages the movable jaw members 164 and 165 and separates them from their respective fixed jaw members 170 and 171. Simultaneously with the separation of the jaw members by the jaw-opening member, the patch-dividing element 210 descends into engagement with the single patch P, folding the same along its medial line and inserting the fold of the patch through the clearance opening 179 in the holding frame 162, in the manner shown in Fig. 21. As the parts are illustrated in Fig. 21, the patch-dividing element 210 has traveled almost to the bottom of its stroke, while the two loading blades 202 and the two stripper sections or members 212 have just contacted the patch P. Additional downward movement of the plunger block 195 imparts only a small amount of additional downward stroke to the patch-dividing blade 210 and during this small amount of movement of the blade 210 the two loading blades 202 move a greater distance to engage, fold and insert or push the opposite halves of the patch into the opened jaws of the holding frame. The result of this movement of the patch-dividing blade 210 and the two loading blades 202 is illustrated in Fig. 22. In this figure, it will be seen that the loading blades 202 have reached the bottom of their stroke, the central fold in the patch effected by the element 210 is below the level of the base-plate 216, the two jaws are loaded, the jaw-separating member 230 has shifted from between the two movable jaw members 164 and 165 to permit them to close under the action of the coil-spring 184, and the stripper members 212 yieldingly clamp the patch upon the surfaces 172 and 173 of the holding frame. It will also be appreciated that when the parts are in the position illustrated in Fig. 22, the slide 193 has actuated the scissors device beneath the base-plate 216 to the extent that the two blades 218 and 219 thereof are opened in preparation for severing the single path adjacent the central fold thereof. As the crank-pin 189, having completed 180 degrees of its single revolution, begins the second half of its revolution the patch-dividing element 210 immediately begins to move upwardly leaving the central fold of the patch P at a level below that of the opened blades 218 and 219 of the scissors device. When the slide 193 moves upwardly to the point where the inclined portion of the scissors actuating cam slot 224 moves past the reduced shank 225 of the blade 219, the scissors device is actuated to sever the patch just above the central fold, as shown in Fig. 23. The single patch is then cut into two separate halves which are properly folded and held in the jaws of the holding frame. During the actuation of the scissors device the two loading blades 202 are withdrawn from the folds of the piping strips. The folded piping strips are prevented from following the two loading blades 202 by the stripper members 212 and the gripping action of the work-engaging edges 182 and 183 of the two movable jaws 164 and 165. It will be understood that the holding frame is now completely loaded with two separate piping strips properly folded and retained in the jaws of the holding frame. The loaded holding frame is ejected by the action of the trip-lever 250 on the frame ejector bell-crank 248, 249 as the slide 193 approaches the top of its stroke. While the loading device is shown as applied to the sewing machine, it will be appreciated that the loading device may be entirely separated from the machine and powered either by an electric motor or by hand.

Having thus set forth the nature of the invention, what we claim herein is:

1. A machine for forming piped openings in a flat body material comprising a frame, stitch-forming mechanism and a work-clamp supported by said frame, means for moving said work-clamp and stitch-forming mechanism relatively to each other to produce a predetermined stitch pattern, a body material cutting mechanism supported by said frame and arranged to cut an opening slit in that portion of a body material which is held in said work-clamp, a piping strip holding frame adapted to have secured therein a plurality of piping strips, piping strip holding frame locating means sustained by said frame and formed to receive said holding frame and thereby to locate said piping strips along the opposite sides of said opening slit, means for operating said body material cutting mechanism before the piping strip holding frame is positioned in said piping strip holding frame locating means, and means for actuating said stitch-forming mechanism to produce a line of stitching securing each of said piping strips to said body material.

2. A machine for forming piped openings in a flat body material comprising a frame, stitch-forming mechanism and a work-clamp supported by said frame, means for moving said work-clamp and stitch-forming mechanism relatively to each other to produce a predetermined stitch pattern, said work-clamp having a lower clamp plate and an upper clamp member arranged to provide laterally spaced sections disposed in work-clamping relation with said lower clamp plate, a body material cutting mechanism supported by said frame and operable to cut a body material between the laterally spaced sections of said upper clamp member, a piping strip holding frame adapted to have secured therein a plurality of piping strips, piping strip holding frame locating means provided on the laterally spaced sections of said upper clamp member for locating said piping strip holding frame between said laterally spaced clamp sections with the piping strips held thereby positioned on opposite sides of said opening slit, means for actuating said body material cutting mechanism before the piping strip holding frame is positioned in said piping strip holding frame locating means, and means for actuating said stitch-forming mechanism to produce stitching securing each of said piping strips to said body material.

3. A machine for forming piped openings in a flat body material comprising a frame, stitch-forming mechanism and a work-clamp supported by said frame, means for moving said work-clamp and stitch-forming mechanism relatively to each other to produce a predetermined stitch pattern, said work-clamp having a lower clamp plate provided with laterally spaced work-engaging portions and an upper clamp member having laterally spaced work-engaging sections opposed to said lower clamp plate work-engaging portions, a body material cutting mechanism supported by said frame and operable to cut an opening slit in a body material, said cutting mechanism including a lower cutter member located to engage the under side of the body material between the laterally spaced work-engaging portions of said lower clamp plate and a cooperating upper cutter member located to engage the upper side of the body material between the laterally spaced work-engaging sections of said upper clamp member, a piping strip holding frame adapted to retain a plurality of piping strips, piping strip holding frame locating means formed on said work-clamp for locating said piping strip holding frame between said laterally spaced cooperating work-clamping parts of said work-clamp with the piping strips adapted to be held by said piping strip holding frame being positioned on opposite sides of said opening slit, means providing for operating said body material cutting mechanism before the piping strip holding frame is positioned in said piping strip holding frame locating means, and means for actuating said stitch-forming mechanism to produce stitching securing each of said piping strips to said body material.

4. A machine for forming piped openings in a flat body material comprising a frame, stitch-forming mechanism and a work-clamp supported by said frame, means for moving said work-clamp and stitch-forming mechanism relatively to each other to produce a predetermined stitch pattern, said work-clamp having a lower clamp plate provided with laterally spaced work-engaging portions and an upper clamp member having laterally spaced work-engaging sections opposed to said lower clamp plate work-engaging portions, a body material cutting mechanism supported by said frame and operable to cut an opening slit in a body material, said cutting mechanism including a lower cutter member located to engage the under side of the body material between the laterally spaced work-engaging portions of said lower clamp plate and a cooperating upper cutter member located to engage the upper side of the body material between the laterally spaced work-engaging sections of said upper clamp member, a piping strip holding frame constructed and arranged to retain a plurality of piping strips, piping strip holding frame locating means formed on the laterally spaced sections of said upper clamp member for locating said piping strip holding frame between said laterally spaced clamp sections with the piping strip adapted to be retained thereby positioned along the opposite sides of said opening slit, means providing for operating said body material cutting mechanism before the piping strip holding frame is positioned in said piping strip holding frame locating means, and means for actuating said stitch-forming mechanism to produce stitching securing each of said piping strips to said body material.

5. A machine for forming piped openings in a flat body material comprising a frame, stitch-forming mechanism and a work-clamp supported by said frame, means for effecting relative movement between said work-clamp and stitch-forming mechanism to traverse a predetermined stitch pattern, a body material cutting mechanism supported by said frame to cut an opening slit in that portion of a body material which is held in said work-clamp, a piping strip holding frame adapted to receive and retain a plurality of piping strips, a loading device for inserting said piping strips into said piping strip holding frame, piping strip holding frame locating means mounted on said work-clamp to receive said holding frame and locate said piping strips along the opposite sides of said opening slit, means providing for operating said body material cutting mechanism before the piping strip holding frame is positioned in said piping strip holding frame locating means, and means for actuating said stitch-forming mechanism to produce stitching securing said piping strips to said body material.

6. A machine for forming piped openings in a flat body material comprising a frame, stitch-forming mechanism and a work-clamp supported by said frame, means for effecting relative movement between said work-clamp and stitch-forming mechanism to traverse a predetermined stitch pattern, a body material cutting mechanism supported by said frame, means supported by said frame and including a one-revolution cutter actuating shaft for operating said body material cutting mechanism to cut an opening slit in that portion of a body material secured in said work-clamp, a piping strip holding frame adapted to receive and retain a plurality of piping strips, a loading device supported on said frame and operatively associated with said one-revolution cutter actuating shaft for inserting said piping strips into said piping strip holding frame, piping strip holding frame locating means mounted on said work-clamp to receive said holding frame so as to locate said piping strips along the opposite sides of said opening slit, and means for actuating said stitch-forming mechanism to produce stitching securing said piping strips to said body material.

7. A machine for forming piped openings in a flat body material comprising a frame, stitch-forming mechanism supported by said frame and including an upper thread carrying needle turnable about an axis, a turret turnable about said axis, and a lower loop-taker mounted on said turret and complemental to said needle in the formation of stitches, a work-clamp supported by said frame, mechanism sustained by said frame for relatively moving the stitch-forming mechanism and the work-clamp to sew about a predetermined pattern, a body material cutting mechanism supported by said frame, means actuating said cutting mechanism to cut an opening slit in that portion of a body material secured in said work-clamp, a piping strip holding frame adapted to receive and retain a plurality of piping strips, a loading device supported on said frame for inserting said piping strips into said piping strip holding frame, means for operating said loading device simultaneously with the operation of said body material cutting mechanism, piping strip holding frame locating means mounted on said work-clamp to receive said holding frame so as to position said piping strips along the opposite sides of said opening slit, and means for actuating said stitch-forming mechanism to produce stitching securing said piping strips to said body material.

8. A piping strip holding frame loading device adapted for a sewing machine having a work-clamp constructed to receive a holding frame adapted to retain fabric piping strips to be stitched to a base material comprising, a supporting structure, holding frame retaining means provided on said supporting structure, a plunger element carried by said supporting structure and movable toward and away from said holding frame retaining means, a piping strip supporting plate located between said plunger element and said holding frame retaining means, and at least one plate-like loading blade carried by said plunger element and adapted to engage a piping strip on said piping strip supporting plate and thereby insert said piping strip into a holding frame located in said holding frame retaining means.

9. A piping strip holding frame loading device adapted for a sewing machine having a work-clamp constructed to receive a holding frame adapted to retain fabric piping strips to be stitched to a base material comprising, a supporting structure, holding frame retaining means provided on said supporting structure, a plunger element carried by said supporting structure and movable toward and away from sad holding frame retaining means, a piping strip supporting plate located between said plunger element and said holding frame retaining means, a pair of substantially parallel plate-like loading blades carried by said plunger element and adapted to engage piping strips on said piping strip supporting plate and thereby to insert said piping strips into a holding frame located in said holding frame retaining means during the advancing stroke of said plunger element, and a stripper member associated with said loading blades to prevent the accidental unloading of the holding frame during the withdrawal stroke of said plunger element.

10. A piping strip holding frame loading device for a sewing machine having a work-clamp constructed to receive a holding frame adapted to retain fabric piping strips which are cut from a patch and are to be stitched to a base material comprising, a supporting structure, holding frame retaining means provided on said supporting structure, first and second plunger elements carried by said supporting structure and movable toward and away from said holding frame retaining means, a piping patch supporting plate located between said plunger elements and said holding frame retaining means, a patch-dividing tongue carried on said first plunger element and adapted to move into engagement with the patch and fold the same along substantially its medial line, a scissors device located adjacent said holding frame retaining means and adapted to cut said folded patch into separate piping strips, and a pair of loading blades carried by said second plunger element and adapted to engage said piping strips and insert them into a holding frame adapted to be located in said holding frame retaining means.

11. A piping strip holding frame loading device for a sewing machine having a work-clamp constructed to receive a holding frame having opposed piping strip clamping jaws adapted to retain fabric piping strips which are cut from a patch and are to be stiched to a base material comprising, a supporting structure, holding frame retaining means provided on said supporting structure, first and second plunger elements carried by said supporting structure and movable toward and away from said holding frame retaining means, a piping patch supporting plate located between said plunger elements and said holding frame retaining means, a patch-dividing tongue carried on said first plunger element and adapted to move into engagement with the patch and thereby fold the same along substantially its medial line, a scissors device located adjacent said holding frame retaining means and adapted to cut said folded patch into separate piping strips, a holding frame jaw-opening member carried on one of said plunger elements to separate the piping strip clamping jaws of said holding frame, and a pair of loading blades carried by said second plunger element and adapted to engage said piping strips and thereby insert them between the jaws of the holding frame adapted to be held in said holding frame retaining means.

12. A piping strip holding frame loading device for a sewing machine having a work-clamp constructed to receive a holding frame adapted to retain fabric piping strips which are cut from a patch and are to be stitched to a base material comprising, a supporting structure, holding frame retaining means provided on said supporting structure, first and second plunger elements supported for movement toward and away from said holding frame retaining means, a piping patch supporting plate located between said plunger elements and said holding frame retaining means, a patch-dividing tongue carried on said first plunger element and adapted to move into engagement with said patch and thereby fold the same along substantially its medial line, a slide member slidable in said supporting structure and having attached to it one of said plunger elements, a scissors device located adjacent said holding frame retaining means and operated by the movement of said slide to cut said folded patch into separate piping strips, and a pair of loading blades carried by said second plunger element and adapted to engage said piping strips and thereby insert them into a holding frame adapted to be located in said holding frame retaining means.

13. A piping strip holding frame for a sewing machine having a work-clamp fitted with piping strip holding frame retaining means and stitching mechanism including a thread-carrying needle comprising, a body member having needle clearance slots formed therein, fixed jaw members provided on said body member and arranged adjacent to said needle clearance slots, side flanges formed on said body member adjacent said fixed jaw members, movable jaw members pivotally mounted directly on said side flanges and disposed in complemental piping strip clamping relation with said fixed jaw members, and yieldable means biasing said movable jaw members toward said fixed jaw members.

14. A piping strip holding frame for a sewing machine having a work-clamp fitted with piping strip holding frame retaining means and stitching mechanism including a thread-carrying needle comprising, a body member having a pair of parallel needle clearance slots formed therein, fixed jaw members provided on said body member and arranged adjacent to and parallel with said needle clearance slots, side flanges formed on said body member adjacent said fixed jaw member, movable jaw members having portions folded about and engaging the outer edges of said side flanges to pivot about said outer edges and move into complemental piping strip clamping relation with said fixed jaw members, and spring means connecting said movable jaw members together to pull them toward said fixed jaw members.

References Cited in the file of this patent
UNITED STATES PATENTS

| | | |
|---|---|---|
| 1,179,378 | Allen | Apr. 11, 1916 |
| 1,475,235 | Mattingly | Nov. 27, 1923 |
| 2,529,072 | Bradford et al. | Nov. 7, 1950 |
| 2,549,294 | De Marco | Apr. 17, 1951 |
| 2,573,359 | Rich | Oct. 30, 1951 |
| 2,620,759 | Pantusco et al. | Dec. 9, 1952 |
| 2,734,470 | Mosberg | Feb. 14, 1956 |